(12) United States Patent
Bacon (10) Patent No.: US 8,419,089 B2
(45) Date of Patent: Apr. 16, 2013

(54) HANDLE ACTUATOR ASSEMBLY FOR DROPDOWN DOORS AND THE LIKE

(75) Inventor: Bruce C. Bacon, Rockford, MI (US)

(73) Assignee: Bauer Products, Inc., Grand Rapids, MI (US)

( * ) Notice: Subject to any disclaimer, the term of this patent is extended or adjusted under 35 U.S.C. 154(b) by 1549 days.

(21) Appl. No.: 11/897,881

(22) Filed: Aug. 31, 2007

(65) Prior Publication Data

US 2009/0058106 A1    Mar. 5, 2009

(51) Int. Cl.
*E05B 3/00* (2006.01)

(52) U.S. Cl.
USPC ............... 292/336.3; 292/DIG. 30; 119/414; 119/501; 49/394

(58) Field of Classification Search ............... 292/336.3, 292/356, DIG. 27, DIG. 30, DIG. 31; 49/394; 119/414, 481, 484, 494, 501, 524
See application file for complete search history.

(56) References Cited

U.S. PATENT DOCUMENTS

| | | | |
|---|---|---|---|
| 1,596,992 A | 8/1926 | Ognowicz | |
| 2,303,624 A | 12/1942 | Edwards et al. | |
| 3,789,550 A | 2/1974 | Seiwert | |
| 4,158,299 A * | 6/1979 | Grabner et al. | 70/224 |
| 4,237,709 A | 12/1980 | Krugener et al. | |
| 4,276,760 A | 7/1981 | Nolin | |
| 4,418,552 A | 12/1983 | Nolin | |
| 4,773,683 A | 9/1988 | Nakamura | |
| 4,936,122 A * | 6/1990 | Osada | 70/214 |
| 5,027,625 A | 7/1991 | Krachten | |
| 5,265,920 A | 11/1993 | Kaup et al. | |
| 5,875,948 A | 3/1999 | Sadler | |
| 5,884,948 A | 3/1999 | Weinerman et al. | |
| 5,975,597 A | 11/1999 | Makiuchi et al. | |
| 6,042,159 A * | 3/2000 | Spitzley et al. | 292/216 |
| 6,059,329 A | 5/2000 | Spitzley | |
| 6,101,853 A | 8/2000 | Herr | |
| 6,363,577 B1 | 4/2002 | Spitzley | |
| 6,629,441 B2 | 10/2003 | Lavergne | |
| 7,070,216 B2 * | 7/2006 | von zur Muehlen | 292/336.3 |
| 7,097,216 B2 * | 8/2006 | Lane et al. | 292/216 |
| 7,155,946 B2 | 1/2007 | Lee et al. | |
| 7,168,755 B2 | 1/2007 | Munezane | |
| 7,819,444 B2 | 10/2010 | Kagawa et al. | |
| 2003/0010073 A1 | 1/2003 | Larsen et al. | |
| 2003/0226384 A1 | 12/2003 | Shedd et al. | |
| 2006/0049647 A1 | 3/2006 | Von Zur Muehlen | |
| 2006/0260203 A1 * | 11/2006 | Wong et al. | 49/394 |
| 2007/0001479 A1 | 1/2007 | Fukuda et al. | |

* cited by examiner

*Primary Examiner* — Carlos Lugo
*Assistant Examiner* — Mark Williams
(74) *Attorney, Agent, or Firm* — Price Heneveld LLP (57) ABSTRACT

A handle actuator for dropdown doors or closures includes a handle with a pivot connector at the top and an actuator rod at the bottom. Upper and lower housings are mounted on the door in a vertically aligned and spaced apart relationship. The upper housing has a pivot connector connected with the pivot connector on the handle, and the lower housing has a sleeve slidably receiving the actuator rod therein for reception. A pivoting actuator arm has opposite ends connected with the actuator rod and the door proximate the handle housing, respectively, such that reciprocation of the actuator rod rotates the actuator arm. A connector has one end connected with the door latch, and the opposite end connected with the actuator arm, such that the door is shifted from the raised closed position to the lowered open position by grasping the handle, pulling the handle outwardly to release the door latch and manually pivoting the door about the bottom hinge to the lowered open position.

25 Claims, 5 Drawing Sheets

HANDLE ACTUATOR ASSEMBLY FOR DROPDOWN DOORS AND THE LIKE

BACKGROUND OF THE INVENTION

The present invention relates to dropdown access doors or closures for animal transport vehicles and the like, and in particular to a handle actuator assembly therefor.

Animal transport vehicles, such as trailers and the like, are equipped for transporting horses and other large animals, and frequently have dropdown doors or closures of the type disclosed in pending U.S. Patent Publications 2006/0260203 and 2007/0028850.

Heretofore, latching mechanisms for such dropdown doors have been rather complex in construction, and somewhat difficult to operate, since the door is normally positioned at an overhead location and must be pivoted outwardly about a bottom hinge, which makes it difficult for the user to comfortably release the latch and carefully control the released door. Hence, there is a need in the art for a door handle and latch actuator assembly that has an uncomplicated construction, is easy to operate and permits the user to exert more control over the released door.

SUMMARY OF THE INVENTION

One aspect of the present invention is dropdown door assembly for animal transport vehicles and the like, comprising a door shaped for selectively closing an associated access opening and including a lower portion thereof with a hinge about which the door is rotated along a generally horizontal axis between a raised closed position and a lowered open position. A latch is operably connected with a door and releasably retains the door in the raised closed position. A handle actuator assembly includes a handle having a medial portion thereof shaped for grasping, an upper portion thereof with a first pivot connector thereon, and a lower portion with an actuator rod thereon. An upper housing is connected with a door and has a second pivot connector rotatably connected with the first pivot connector at a pivot axis to permit the upper portion of handle to pivot about the pivot axis in a normally generally vertical plane. A lower housing is connected with the door at a location vertically aligned with and below the upper housing, and has a sleeve slidably receiving the actuator rod therein to permit the lower portion of the handle to reciprocate relative to the sleeve in a normally generally axial direction. An actuator arm has one end thereof pivotally connected with a housing portion of the handle actuator assembly, and an opposite end thereof pivotally connected with the actuator rod, such that reciprocation of the actuator rod rotates the actuator arm. A connector member has one end thereof operably connected with the latch and an opposite end thereof operably connected with the actuator arm, whereby the door is shifted from the raised closed position to the lowered open position by grasping the medial portion of the handle, pulling the handle outwardly thereby pivoting the same about the pivot axis to shift the actuator rod outwardly and thereby unlock the latch, and manually pivoting the door about the hinge to the lowered open position.

Another aspect of the present invention is an animal transport vehicle of the type having at least one bottom hinged dropdown feed door which is manually rotated between a raised closed position and a lowered open position, and includes a latch which releasably retains the door in the raised closed position. A handle actuator assembly is mounted in the feed door, and includes a handle having a medial portion thereof shaped for grasping, an upper portion thereof with a first pivot connector thereon, and a lower portion with an actuator rod thereon. An upper housing is connected with a feed door and has a second pivot connector rotatably connected with the first pivot connector at a pivot axis to permit the upper portion of the handle to pivot about the pivot axis in a normally generally vertical plane. A lower housing is connected with the feed door at a location vertically aligned with and below the upper housing, and has a sleeve slidably receiving the actuator rod therein to permit the lower portion of the handle to reciprocate relative to the sleeve in a normally generally axial direction. An actuator arm has one end thereof pivotally connected with a housing portion of the handle actuator assembly, and an opposite end thereof pivotally connected with the actuator rod, such that reciprocation of the actuator rod rotates the actuator arm. A connector member has one end thereof operably connected with the latch and an opposite end thereof operably connected with the actuator arm, whereby the feed door is shifted from the raised closed position to the lowered open position by grasping the medial portion of the handle, pulling the handle outwardly thereby pivoting the same about the pivot axis to shift the actuator rod outwardly and thereby unlock the latch, and manually pivoting the feed door about the hinged bottom to the lowered open position.

Yet another aspect of the present invention is a handle actuator assembly for dropdown doors of the type having a door selectively closing an associated access opening with a hinge along the lower portion thereof to pivot the door between a raised closed position and a lowered open position, and a latch connected with the door and releasably retaining the door in the raised closed position. The handle actuator assembly includes a handle having a medial portion thereof shaped for grasping, an upper portion thereof with a first pivot connector thereon, and a lower portion with an actuator rod thereon. An upper housing is shaped for connection with the door and has a second pivot connector rotatably connected with the first pivot connector at a pivot axis to permit the upper portion of handle to pivot about the pivot axis in a normally generally vertical plane. A lower housing is shaped for connection with the door at a location vertically aligned with and below the upper housing, and has a sleeve slidably receiving the actuator rod therein to permit the lower portion of the handle to reciprocate relative to the sleeve in a normally generally axial direction. An actuator arm has one end thereof pivotally connected with a housing portion of the handle actuator assembly, and an opposite end thereof pivotally connected with the actuator rod, such that reciprocation of the actuator rod rotates the actuator arm. A connector member has one end thereof operably connected with the latch and an opposite end thereof operably connected with the actuator arm, whereby the door is shifted from the raised closed position to the lowered open position by grasping the medial portion of the handle, pulling the handle outwardly thereby pivoting the same about the pivot axis to shift the actuator rod outwardly and thereby unlock the latch, and manually pivoting the door about the hinge to the lowered open position.

Yet another aspect of the present invention is a handle actuator assembly for dropdown doors and the like which has an uncomplicated construction, is easy to operate and allows the user to exert more control over a released door. Preferably, the handle actuator assembly has a uniquely shaped and supported handle which functions both as a handle to pivot the associated door between closed and open positions, and as an actuator to latch and unlatch the door latch. When grasped and pulled outwardly, the handle actuator assembly contemporaneously unlatches the latch and shifts the door open in a single, comfortable motion.

These and other advantages of the invention will be further understood and appreciated by those skilled in the art by reference to the following written specification, claims and appended drawings.

DETAILED DESCRIPTION OF THE PREFERRED EMBODIMENTS

For purposes of description herein, the terms "upper", "lower", "right", "left", "rear", "front", "vertical", "horizontal" and derivatives thereof shall relate to the invention as oriented in FIGS. 8-11. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 8:
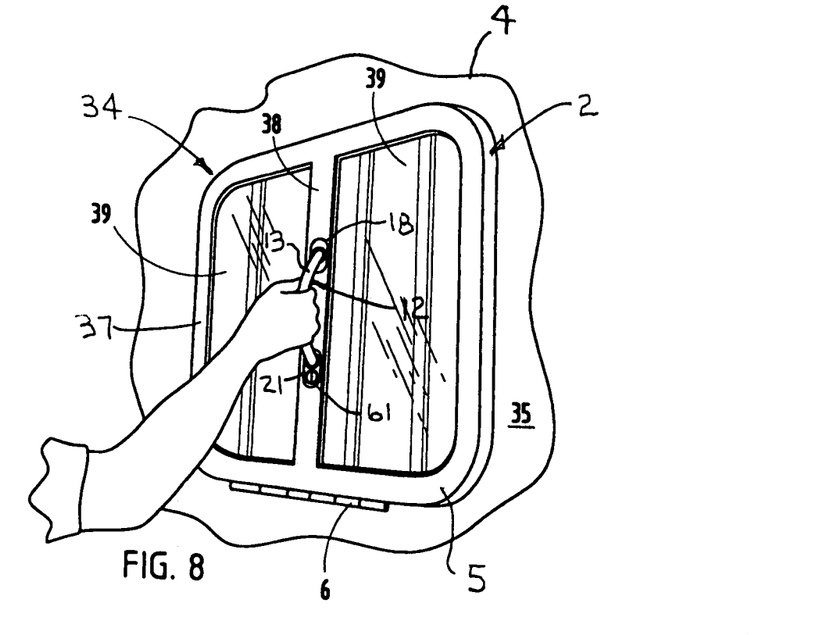
FIG. 8 is a fragmentary perspective view of the dropdown door assembly, wherein the door is shown in a raised closed position and the user is shown unlocking the latch.
Figure 9:
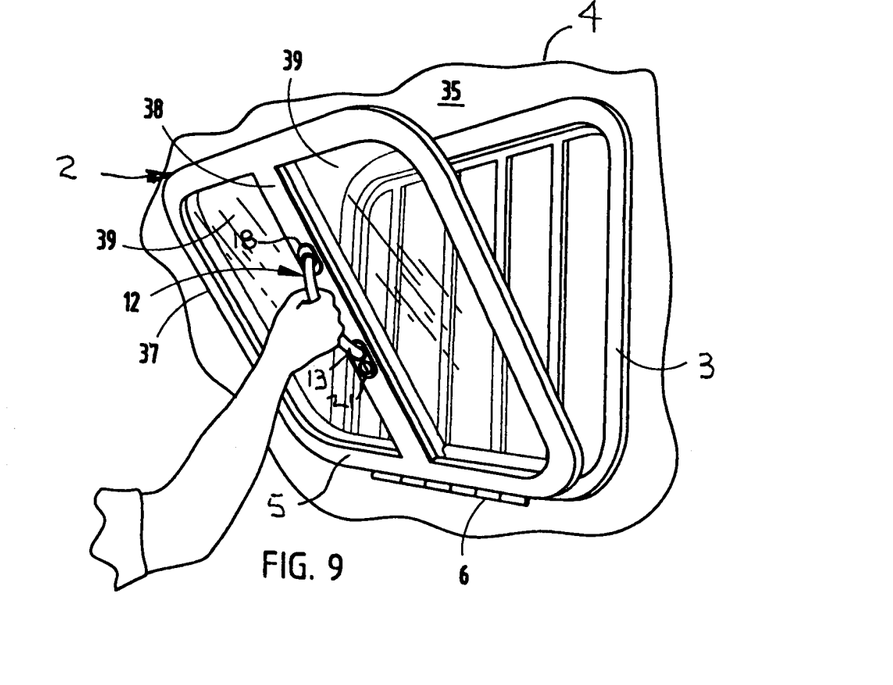
FIG. 9 is a fragmentary perspective view of the dropdown door assembly, wherein the door is shown shifted to a partially open position by the user.
Figures 10, 11:
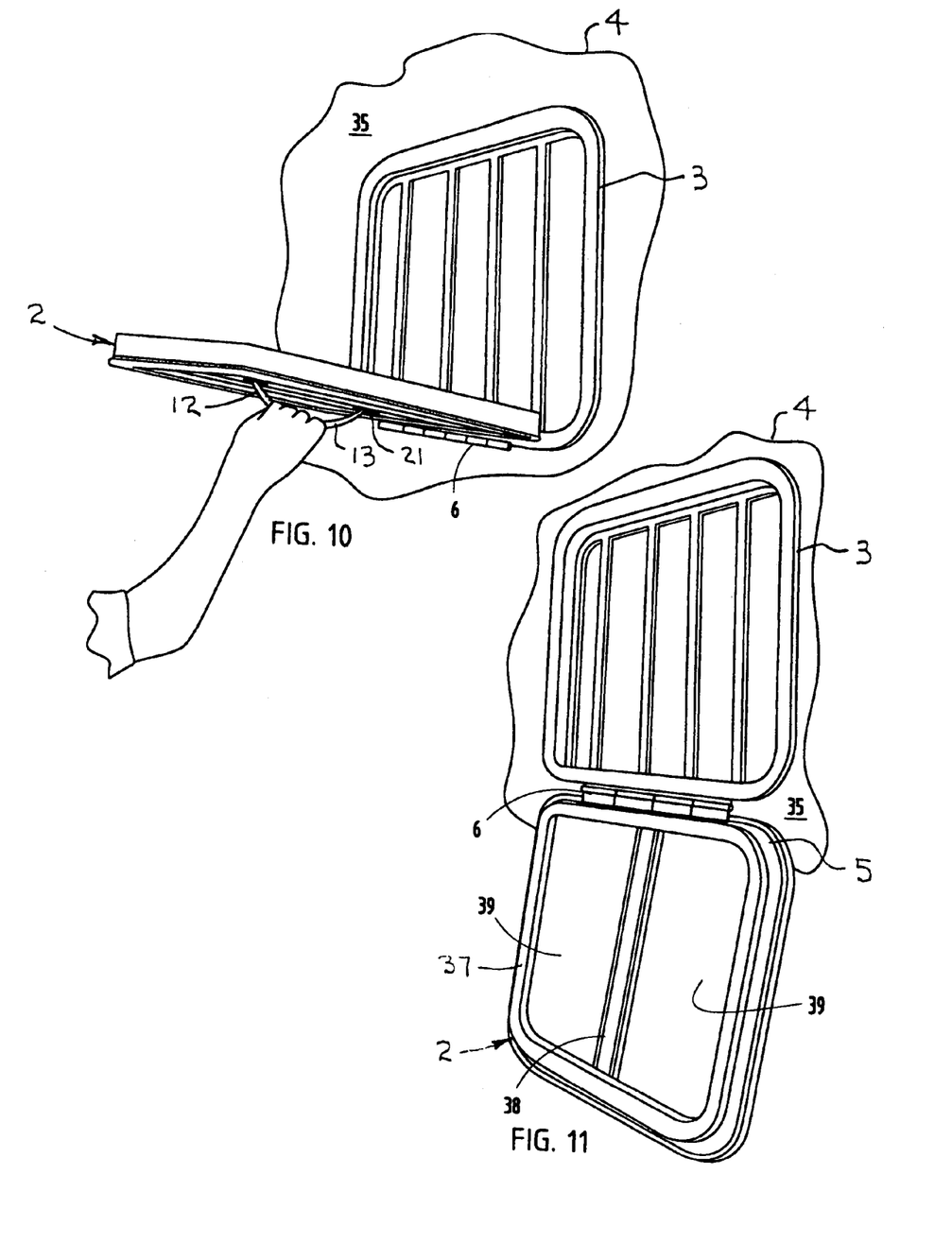
FIG. 10 is a fragmentary perspective view of the dropdown door assembly, wherein the door is shown shifted to a half open position by the user.
FIG. 11 is a fragmentary perspective view of the dropdown door assembly, wherein the door is shown shifted to a lowered fully open position by the user.

The reference numeral 1 (FIGS. 1 and 2) generally designates a handle actuator assembly embodying the present invention, which is configured for use in conjunction with dropdown doors or closures, such as the illustrated feed door 2 which is shaped to selectively close an associated window or access opening 3 in vehicle 4, and includes a lower portion 5 with a hinge 6. Door 2 is rotated along a generally horizontal axis between a raised closed position (FIG. 8) and a lowered open position (FIG. 11). A latch 9 is operably connected with door 2 and releasably retains door 2 in the raised closed position, as shown in FIG. 8. Handle actuator assembly 1 includes a handle 12 having a medial portion 13 shaped for grasping, an upper portion 14 with a first pivot connector 15 thereon, and a lower portion 16 with an actuator rod 17 thereon. An upper housing 18 is connected with door 2 and has a second pivot connector 19 rotatably connected with first pivot connector 15 at a pivot axis 20 to permit the upper portion 14 of handle 12 to pivot about pivot axis 20 in a normally generally vertical plane. A lower housing 21 is connected with door 2 at a location vertically aligned with and below upper housing 14, and has a sleeve 22 slidably receiving actuator rod 17 therein to permit the lower portion 16 of handle 12 to reciprocate relative to sleeve 22 in a normally generally axial direction. An actuator arm 23 has one end portion 24 pivotally connected with a housing portion 25 of handle actuator assembly 1, and an opposite end portion 26 pivotally connected with actuator rod 17, such that reciprocation of actuator rod 17 rotates actuator arm 23. A connector 27 has one end 28 operably connected with latch 9 and an opposite end 29 operably connected with actuator arm 23, whereby door 2 is shifted from the raised closed position (FIG. 8) to the lowered open position (FIG. 11) by grasping the medial portion 13 of handle 12, pulling handle 12 outwardly, thereby pivoting the same about pivot axis 20 to shift actuator rod 17 outwardly and thereby unlock latch 9 (FIG. 11), and manually pivoting door 2 about bottom hinge 6 to the lowered open position in the manner illustrated in FIGS. 9-11.

Figure 1:
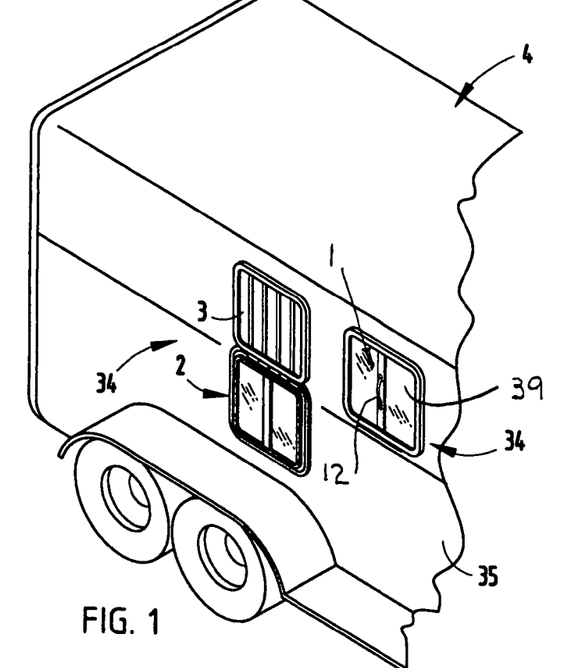
FIG. 1 is a fragmentary perspective view of an animal transport vehicle having a pair of dropdown door assemblies with handle actuators embodying the present invention.
Figure 2:
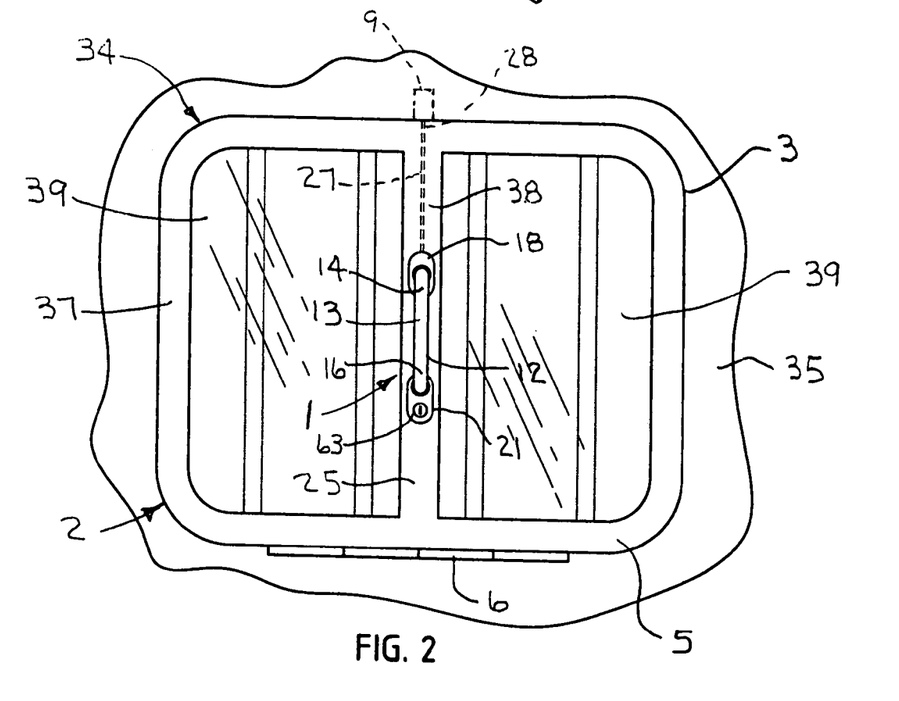
FIG. 2 is a fragmentary front elevational view of the vehicle and one of the dropdown door assemblies.

In the embodiment illustrated in FIG. 1, a pair of dropdown door assemblies are shown installed in the sidewall 35 of an animal transport trailer 4. Dropdown door assemblies 34 are located in the upper portion of trailer sidewalls 35, and are operated from the outside or exterior of trailer 4. Each assembly 34 includes a closure or door, such as a window or the illustrated feed door 2, which is mounted to the trailer sidewall 35 along the lower portions 5 thereof by hinges 6. It is to be understood that the term "door" as used herein is intended to include a wide variety of different types of closures which selectively close off an associated window or access opening in vehicle 4, such as an opaque access door, a see-through window, a feed door with or without windows, and the like. In the illustrated example, each door 2 has a latch 9 mounted at the upper portion thereof, which protrudes outwardly from a marginal frame portion 37 of the assembly 35 and engages the adjacent trailer sidewall 35 to selectively retain doors 2 in the raised closed position. The illustrated latches 9 are reciprocating pull latches, and selectively extend outwardly from the marginal frame portion 37 of assembly 34. Each door 2 also includes a center mullion 38 which extends generally vertically along a medial portion of marginal frame 37. The illustrated door 2 includes two panels 39 of glass, transparent plastic or the like mounted in marginal frame 37 on the opposite sides of mullion 38. Marginal frame 37 and mullion 38 are interconnected to form a rigid door frame, and may be constructed from extruded aluminum or similar weather resistant materials. While the illustrated doors 2 pivot about horizontal hinges 6, it is to be understood that the present invention also contemplates mounting doors 2 on vertical hinges for use as access doors for vehicle 4 or the like.

As shown in FIGS. 8-11, the handle actuator assemblies 1 are typically mounted on the lower portions of doors 2, but are still at a height which is normally overhead, or nearly so, at least for an average height user when doors 2 are in the raised closed position (FIG. 8), due largely to the inherent design features of vehicle 4. It is this elevated position that has made prior door latches difficult and uncomfortable to operate, particularly for users of less strength, height and/or dexterity.

Figure 5:
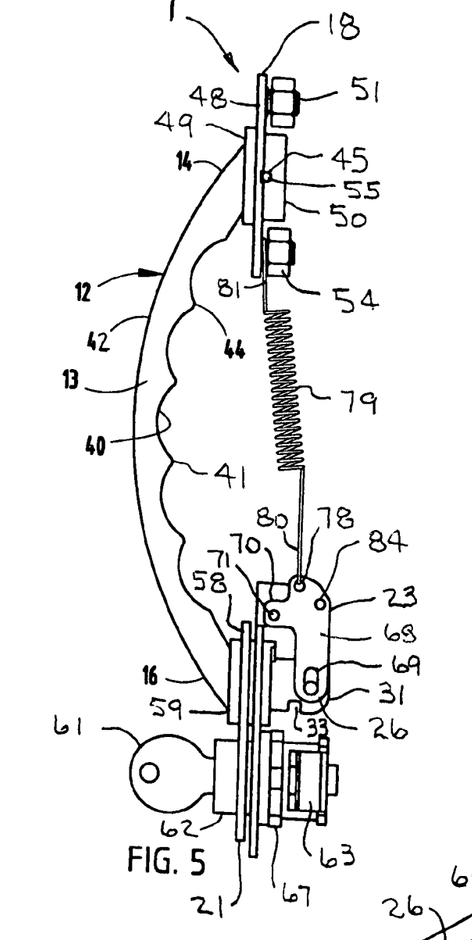
FIG. 5 is a side elevational view of the handle actuator shown in a latched condition.
Figure 6:
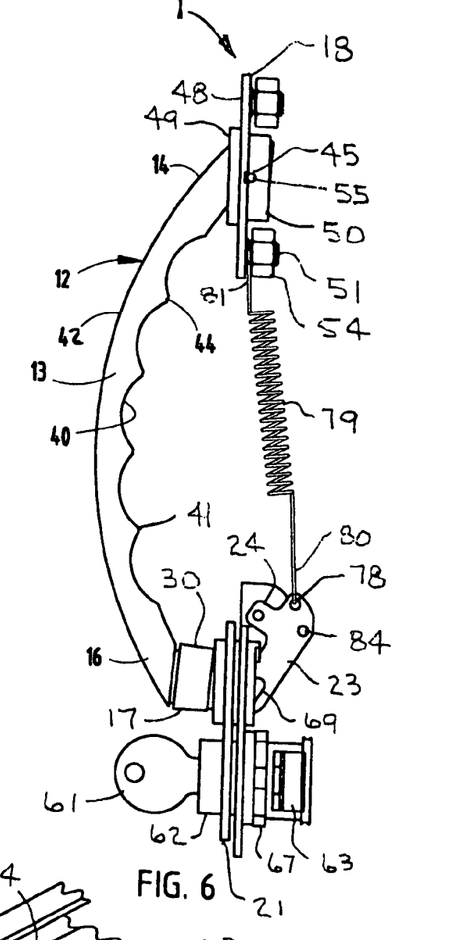
FIG. 6 is a side elevational view of the handle actuator shown in an unlatched position.

The illustrated handle 12 has a one-piece molded construction, and is preferably made from a die cast zinc, a synthetic material or the like that is weather resistant. More specifically, the medial portion 13 of the illustrated handle 12 is relatively long, in the nature of five to seven inches, has a generally arcuate side elevational configuration, as best shown in FIGS. 5 and 6, and includes a plurality of finger recesses 40 disposed along the interior surface 41 thereof to facilitate comfortably and securely grasping and manipulating handle 12 in the manner shown in FIGS. 8-11, and discussed in greater detail hereinafter. The exterior surface 44 of handle 12 is rounded, and also conforms comfortably to the shape of the user's hand.

Figure 3:
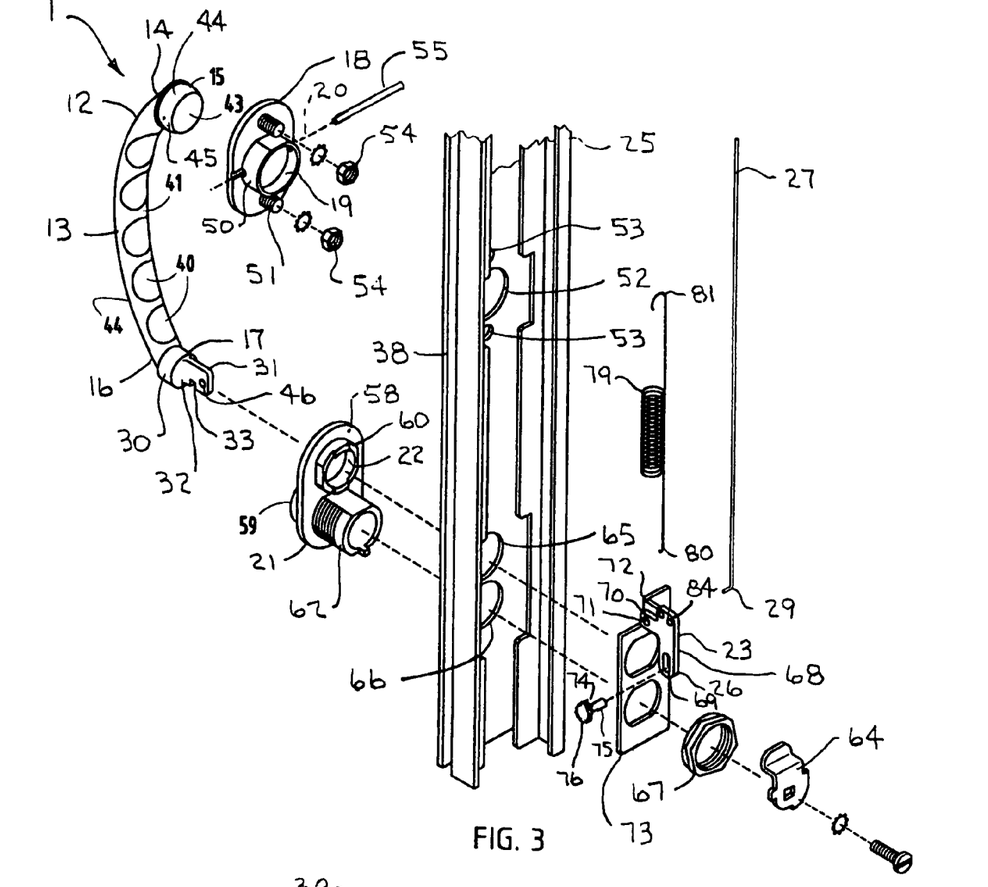
FIG. 3 is an exploded perspective view of the handle actuator assembly and an associated mullion portion of the dropdown door.
Figure 4:
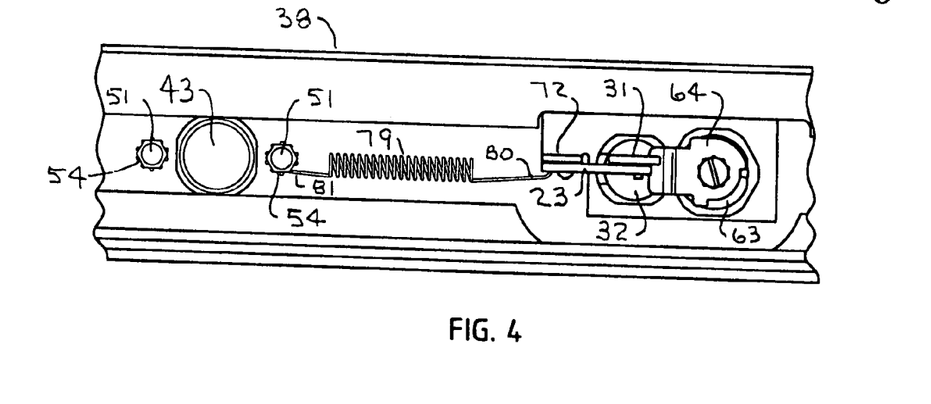
FIG. 4 is a rear elevational view of the handle actuator shown installed in the mullion.

In the illustrated example, the first pivot connector 15 on the upper portion 14 of handle 12 is in the form of a ball member that has at least a partially spherical configuration and is formed integral with the medial portion 13 of handle 12. The ball member pivot 15 shown in FIG. 3 has a flat rear face 43, and a spherical sidewall 44 with a horizontally extending through hole 45 to pivotally connect the same with upper housing 18, as described in greater detail below. In the illustrated example, actuator rod 17 is formed integrally on the lower portion 16 of handle 12, and has a generally cylindrical or plug shape, as best illustrated in FIG. 3. The illustrated actuator rod or plug 17 is solid, has a tapered sidewall 30 and includes an integrally formed tab 31 projecting rearwardly or inwardly from a flat rear wall 32 thereof. Tab 31 is generally flat, and has a downwardly opening notch 33 in the lower edge thereof, and a through aperture 46 adjacent the free end thereof, which serves to pivotally connect actuator arm 23 therewith, as described hereinafter.

The illustrated upper housing 18 includes a generally flat mounting plate 48, which has a rear surface that abuts and is connected with the outer surface of mullion 38. In the illustrated example, the second pivot connector 19 on upper housing 18 is in the form of a socket member having at least a partially spherical portion which closely receives therein the ball member pivot 15 on the upper portion 14 of handle 12. The illustrated socket member 19 is at least partially formed by an annular exterior boss 49 which projects outwardly from mounting plate 48, and an annular interior boss 50 which extends inwardly from the rearward surface of mounting plate 48. A pin 55 extends through horizontally aligned apertures 56 in interior boss 50 and the through hole 45 on the sidewall 44 of ball member pivot 15 to pivotally interconnect the same for mutual rotation about pivot axis 20. A pair of threaded studs 51 extend rearwardly from the interior face of mounting plate 48 and facilitate mounting upper housing 18 to mullion 38. More specifically, the upper portion of mullion 38 includes a central aperture 52 in which interior boss 50 is received, and a pair of fastener apertures 53 through which studs 51 are received. Nuts 54 are attached to the free ends of studs 51 and securely mount upper housing 18 to the upper portion of mullion 38. Preferably, mounting plate 48 and bosses 49 and 50 are integrally molded from a die cast zinc, a synthetic resin material, or another weather resistant material that is similar to that of handle 12.

Figure 7:
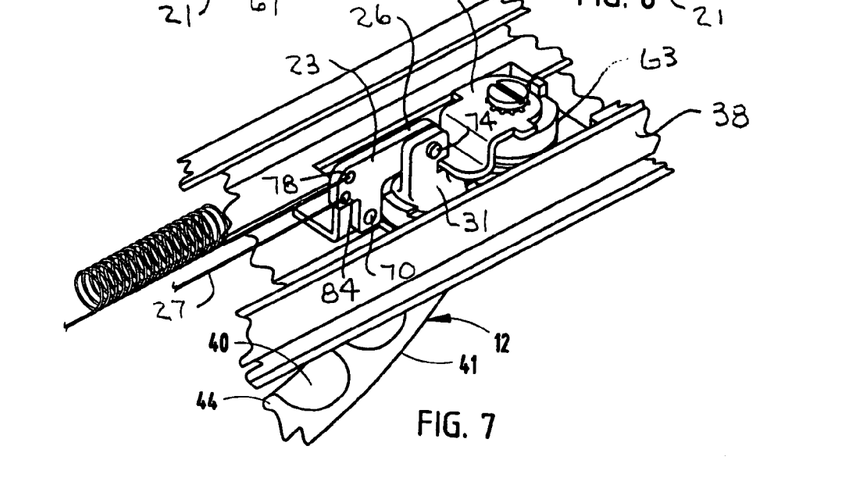
FIG. 7 is an enlarged, fragmentary perspective view of the handle actuator with a lock portion thereof shown in a locked position.

The illustrated lower housing 21 also includes a flat mounting plate portion 58 with an exterior boss 59 and an interior boss 60, which together define sleeve 22. The illustrated sleeve 22 has a generally cylindrical shape. Lower housing 21 also includes a key lock assembly 61 that is received into an associated lock housing 62, which is formed integral with mounting plate 58, and disposed directly below bosses 59 and 60. A lock cylinder 63 is rotatably mounted in lock housing 62, and includes a lock cam 64 mounted on the rear face of lock cylinder 63 which interfaces with actuator rod 17 to positively retain door 2 in the raised closed position. More specifically, the outwardly opening notch 33 on the rearward tab 31 of actuator rod 17 is shaped to closely receive the outer portion of lock cam 64 therein when lock cylinder 63 is shifted to the fully locked position, as shown in FIG. 7. The engagement between lock cam 64 and actuator rod notch 33 positively prevents the lower portion 16 of handle 12 from reciprocating relative to lower housing 21, such that latch 9 cannot be shifted to the unlatched position.

The lower portion of the illustrated mullion 38 has two circular apertures 65 and 66 therethrough which serve to mount lower housing 21 on mullion 38. More specifically, the interior boss 60 on mounting plate 58 extends through mullion aperture 65, while the rear portion of lock cylinder 63 extends through mullion aperture 66. The exterior surface of lock cylinder 63 is threaded, and receives a nut 67 thereon which tightens against the rear surface of mullion 38 to securely, yet detachably, mount lower housing 21 on mullion 38. In the illustrated example, a mounting bracket 73 is positioned over apertures 65 and 66 on the rear side of mullion 38 and held in place by nut 67, as described in greater detail below.

The illustrated actuator arm 23 is in the nature of a bell crank, and has a generally T-shaped side elevational configuration, as best illustrated in FIGS. 3, 5 and 6. The illustrated actuator arm 23 includes a vertical arm portion 68 with a vertically elongate slot 69 at the lower end thereof which serves to connect actuator arm 23 with actuator rod 17 for mutual rotation and translation, as described more fully below. Actuator arm 23 also includes a short horizontal arm 70 with an aperture and pin 71 therethrough at its interior end which pivotally connect the upper end of actuator arm 23 with an inwardly protruding tab 72 on connector bracket 73, which is in turn mounted on the interior surface of mullion 38 by nut 67. The upper end of vertical arm 68 also includes a horizontal through aperture 78 in which is received and retained one end of a coil spring 79, which serves to urge actuator arm 23 to the normally latched position. In the illustrated example, the opposite end 81 of coil spring 79 is attached to the lowermost stud 51 of upper housing 18, and retained thereon by nut 54. Preferably, coil spring 79 is pre-tensed in the latched position. Actuator arm 23 also includes another horizontal through aperture 84 located generally opposite pin 71 and shaped to receive therein one end 29 of connector 27, which may be a rod, or in the illustrated example, is in the nature of a flexible line or cable. The opposite end 28 of cable 27 is attached to latch 9. A connector pin 74 interconnects actuator rod 17 and actuator arm 23 for mutual articulation in the following manner. The shank end 75 of connector pin 74 is inserted through the vertically elongate slot 69 at the lower end of vertical arm 68, and anchored fixedly in the through aperture 46 of actuator rod tab 31 by means such as staking, swaging, or the like. The opposite end of connector pin 74 has an enlarged head 76 which captures the lower end of arm 68 between tab 31 and head 76 in a manner which permits pin 71 to slide along elongate slot 69 as tab 31 and arm 68 rotate with respect to one another. The articulated joint which connects actuator rod 17 and actuator arm 23 permits the plug-shaped rod 17 to reciprocate above a slight arc as dictated by pivot axis 20 and shown in FIG. 6, yet be securely seated in sleeve 22 in the latched position shown in FIG. 5. Consequently, when the user pulls handle 12 outwardly, it pivots about axis 20 and shifts actuator rod 17 outwardly thereby rotating actuator arm 23 in a clockwise direction as shown in FIGS. 5 and 6, which in turn tenses cable 27 and shifts latch 9 to its unlatched position.

As best illustrated in FIGS. 8-11, door 2 is shifted from the raised closed position (FIG. 8) to the lowered open position (FIG. 11) in the following manner. The user is positioned on the outside of trailer 4 adjacent mullion 38, and reaches upwardly grasping the medial portion 13 of handle 12 in the manner illustrated in FIG. 8. The user then pulls handle 12 outwardly, such that the upper portion 13 of handle 12 pivots outwardly about pivot axis 20 in a counterclockwise direction, and actuator rod 17 reciprocates outwardly toward the user. The relatively long length of handle 12, in conjunction with the pivot connection of the upper portion 14 thereof with upper housing 18 and mullion 38, provide significant mechanical advantage, such that the outward shifting of handle 12 to unlatch latch 9 can be accomplished easily, even by users without great strength or height. The outward reciprocation of actuator rod 17 rotates actuator arm 23 about pin 71, which in turn tenses cable 27 and shifts latch 9 to the unlatched position. The user maintains his or her grasp on the medial portion 13 of handle 12, and continues to pull the same outwardly, which causes door 2 to pivot smoothly about bottom hinge 6 toward the user in a controlled fashion. The unidirectional nature of the pulling force applied by user to handle 12 permits the user to easily unlatch door 2 and accurately control the speed at which door 2 is rotated from the raised closed position to the lowered open position using a single continuous motion as shown in FIGS. 8-11, and thereby avoid discomfort and/or impact between door 2 and the trailer sidewall 35 or adjacent objects. The outward pulling force on handle 12 by the user simultaneously unlatches latch 9 and shifts door 2 toward its lowered open position in a single, unidirectional and comfortable motion, while maintaining substantially the same grip on handle 12, which greatly reduces user strain and/or discomfort.

In a similar manner, door 2 is shifted from the lowered open position (FIG. 11) to the raised closed position (FIG. 8) by grasping the medial portion 13 of handle 12, and pulling the same outwardly to rotate door 2 about hinge 6 to the raised closed position. When the user's grasp is released from handle 12, coil spring 79 automatically shifts the lower portion 16 of handle 12 inwardly, thereby retracting actuator rod 17 and shifting latch 9 into the fully latched position to securely retain door 2 in the raised closed position shown in FIG. 8.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A dropdown door assembly for animal transport vehicles, comprising:
    a door shaped for selectively closing an associated access opening and including a lower portion thereof with a hinge about which said door is rotated about a generally horizontal axis along a generally vertical plane between a raised closed position and a lowered open position;
    a latch operably connected with said door and releasably retaining said door in said raised closed position; and
    a combination handle and latch actuator assembly, comprising:
        a handle having a medial portion thereof shaped for grasping, an upper portion thereof with a first pivot connector thereon and a lower portion thereof with an actuator rod thereon;
        an upper housing connected with said door and having a second pivot connector rotatably connected with said first pivot connector at a pivot axis to permit said upper portion of said handle to pivot about said pivot axis in a normally generally vertical plane;
        a lower housing connected with said door at a location vertically aligned with and below said upper housing, and having a sleeve slidably receiving said actuator rod therein to permit said lower portion of said handle to reciprocate relative to said sleeve in a normally generally axial direction;
        an actuator arm having one end thereof pivotally connected with said door proximate said lower housing, and an opposite end of the actuator arm pivotally connected with said actuator rod, such that reciprocation of said actuator rod rotates said actuator arm; and
        a connector member having one end thereof operably connected with said latch and an opposite end thereof operably connected with said actuator arm, whereby said door is shifted from said raised closed position to said lowered open position by grasping said medial portion of said handle, and pulling said handle outwardly, thereby pivoting said handle about said pivot axis, shifting said actuator rod outwardly and thereby unlocking said latch, and simultaneously manually pivoting said door downwardly about said hinge in a single, unidirectional, continuous motion to said lowered open position in a controlled fashion.

2. A door assembly as set forth in claim 1, including:
a lock having a lock cam portion thereof selectively engaging said actuator rod to positively retain said handle actuator assembly in a locked condition.

3. A door assembly as set forth in claim 2, wherein:
said lock comprises a key lock having a rotating lock cylinder portion thereof operably connected with said lock cam.

4. A door assembly as set forth in claim 3, wherein:
said actuator rod includes an outwardly opening notch in which a portion of said lock cam is received in said locked condition.

5. A door assembly as set forth in claim 4, including:
a biasing member operably connected with said actuator arm and resiliently urging the same inwardly to retain said latch in a latched position.

6. A door assembly as set forth in claim 5, wherein:
said actuator rod and said actuator arm are interconnected for mutual articulation.

7. A door assembly as set forth in claim 6, wherein:
said first pivot connector comprises a ball member; and
said second pivot connector comprises a socket member in which said ball member is pivotally retained.

8. A door assembly as set forth in claim 7, wherein:
said actuator rod is cylindrically-shaped and formed integrally with said handle; and
said sleeve comprises a cylindrically-shaped housing formed integrally with said lower housing and closely receiving said actuator rod therein for reciprocation between latched and unlatched positions.

9. A door assembly as set forth in claim 8, wherein:
said medial portion of said handle includes finger recesses along an interior surface thereof to facilitate grasping said handle.

10. A door assembly as set forth in claim 9, wherein:
said latch comprises a pull latch.

11. A door assembly as set forth in claim 10, wherein:
said door comprises a feed door.

12. A door assembly as set forth in claim 1, including:
a biasing member operably connected with said actuator arm and resiliently urging the same inwardly to retain said latch in a latched position.

13. A door assembly as set forth in claim 1, wherein:
said first pivot connector comprises a ball member; and
said second pivot connector comprises a socket member in which said ball member is pivotally retained.

14. A door assembly as set forth in claim 1, wherein:
said actuator rod is cylindrically-shaped and formed integrally with said handle; and
said sleeve comprises a cylindrically-shaped housing formed integrally with said lower housing and closely receiving said actuator rod therein for reciprocation between latched and unlatched positions.

15. A door assembly as set forth in claim 1, wherein:
said medial portion of said handle includes finger recesses along an interior surface thereof to facilitate grasping said handle.

16. A door assembly as set forth in claim 1, wherein:
said latch comprises a pull latch.

17. A door assembly as set forth in claim 1, wherein:
said door comprises a feed door.

18. In an animal transport vehicle of the type having at least one bottom hinged dropdown feed door which is manually rotated along a generally vertical plane between a raised closed position and a lowered open position, and including a latch which releasably retains said door in said raised closed position, the improvement of a combination handle and latch actuator assembly, comprising:
a handle having a medial portion thereof shaped for grasping, an upper portion thereof with a first pivot connector thereon and a lower portion thereof with an actuator rod thereon;
an upper housing connected with said feed door and having a second pivot connector rotatably connected with said first pivot connector at a pivot axis to permit said upper portion of said handle to pivot about said pivot axis in a normally generally vertical plane;
a lower housing connected with said feed door at a location vertically aligned with and below said upper housing, and having a sleeve slidably receiving said actuator rod therein to permit said lower portion of said handle to reciprocate relative to said sleeve in a normally generally axial direction;
an actuator arm having one end thereof pivotally connected with said door proximate said lower housing, and an opposite end of the actuator arm pivotally connected with said actuator rod such that reciprocation of said actuator rod rotates said actuator arm; and
a connector member having one end thereof operably connected with said latch and an opposite end thereof operably connected with said actuator arm, whereby said feed door is shifted from said raised closed position to said lowered open position by grasping said medial portion of said handle, and pulling said handle outwardly, thereby pivoting said handle about said pivot axis, shifting said actuator rod outwardly and thereby unlocking said latch, and simultaneously manually pivoting said feed door downwardly about said hinged bottom in a single, unidirectional, continuous motion to said lowered open position in a controlled fashion.

19. A transport vehicle as set forth in claim 18, including:
a lock having a lock cam portion thereof selectively engaging said actuator rod to positively retain said handle actuator assembly in a locked condition.

20. A transport vehicle as set forth in claim 19, including:
a biasing member operably connected with said actuator arm and resiliently urging the same inwardly to retain said latch in a latched position.

21. A transport vehicle as set forth in claim 20, wherein:
said first pivot connector comprises a ball member;
said second pivot connector comprises a socket member in which said ball member is pivotally retained;
said actuator rod is cylindrically-shaped and formed integrally with said handle; and
said sleeve comprises a cylindrically-shaped housing formed integrally with said lower housing and closely receiving said actuator rod therein for reciprocation between latched and unlatched positions.

22. A combination handle and latch actuator assembly for dropdown doors of the type having a door selectively closing an associated access opening with a hinge along a lower portion thereof to pivot the door along a generally vertical plane between a raised closed position and a lowered open position, and a latch connected with the door and releasably retaining the door in the raised closed position; said assembly comprising:
a handle having a medial portion thereof shaped for grasping, an upper portion thereof with a first pivot connector thereon and a lower portion thereof with an actuator rod thereon; an upper housing shaped for connection with the door and having a second pivot connector rotatably connected with said first pivot connector at a pivot axis to permit said upper portion of said handle to pivot about said pivot axis in a normally generally vertical plane;
a lower housing shaped for connection with the door at a location vertically aligned with and below said upper housing, and having a sleeve slidably receiving said actuator rod therein to permit said lower portion of said handle to reciprocate relative to said sleeve in a normally generally axial direction;
an actuator arm having one end thereof pivotally connected with said door proximate said lower housing, and an opposite end of the actuator arm pivotally connected with said actuator rod, such that reciprocation of said actuator rod rotates said actuator arm; and
a connector member having one end thereof operably connected with said latch and an opposite end thereof operably connected with said actuator arm, whereby the door is shifted from the raised closed position to the lowered open position by grasping said medial portion of said handle, and pulling said handle outwardly thereby pivoting said handle about said pivot axis shifting said actuator rod outwardly and thereby unlocking said latch, and simultaneously manually pivoting the door downwardly about the hinge in a single, unidirectional, continuous motion to the lowered open position in a controlled fashion.

23. A handle actuator as set forth in claim 22, including:
a lock having a lock cam portion thereof selectively engaging said actuator rod to positively retain said handle actuator assembly in a locked condition, wherein:
said lock comprises a key lock having a rotating lock cylinder portion thereof operably connected with said lock cam; and
said actuator rod includes an outwardly opening notch in which a portion of said lock cam is received in said locked condition.

24. A handle actuator as set forth in claim 23, including:
a biasing member operably connected with said actuator arm and resiliently urging the same inwardly to retain said latch in a latched position.

25. A handle actuator as set forth in claim 24, wherein:
said first pivot connector comprises a ball member;
said second pivot connector comprises a socket member in which said ball member is pivotally retained;
said actuator rod is cylindrically-shaped and formed integrally with said handle; and
said sleeve comprises a cylindrically-shaped housing formed integrally with said lower housing and closely receiving said actuator rod therein for reciprocation between latched and unlatched positions.

* * * * *